April 8, 1958
L. J. KRESSLEY ET AL
2,829,953
MEANS FOR DETERMINING THE EXTENT OF INERT
IMPURITIES IN OXYGEN
Filed Nov. 4, 1955
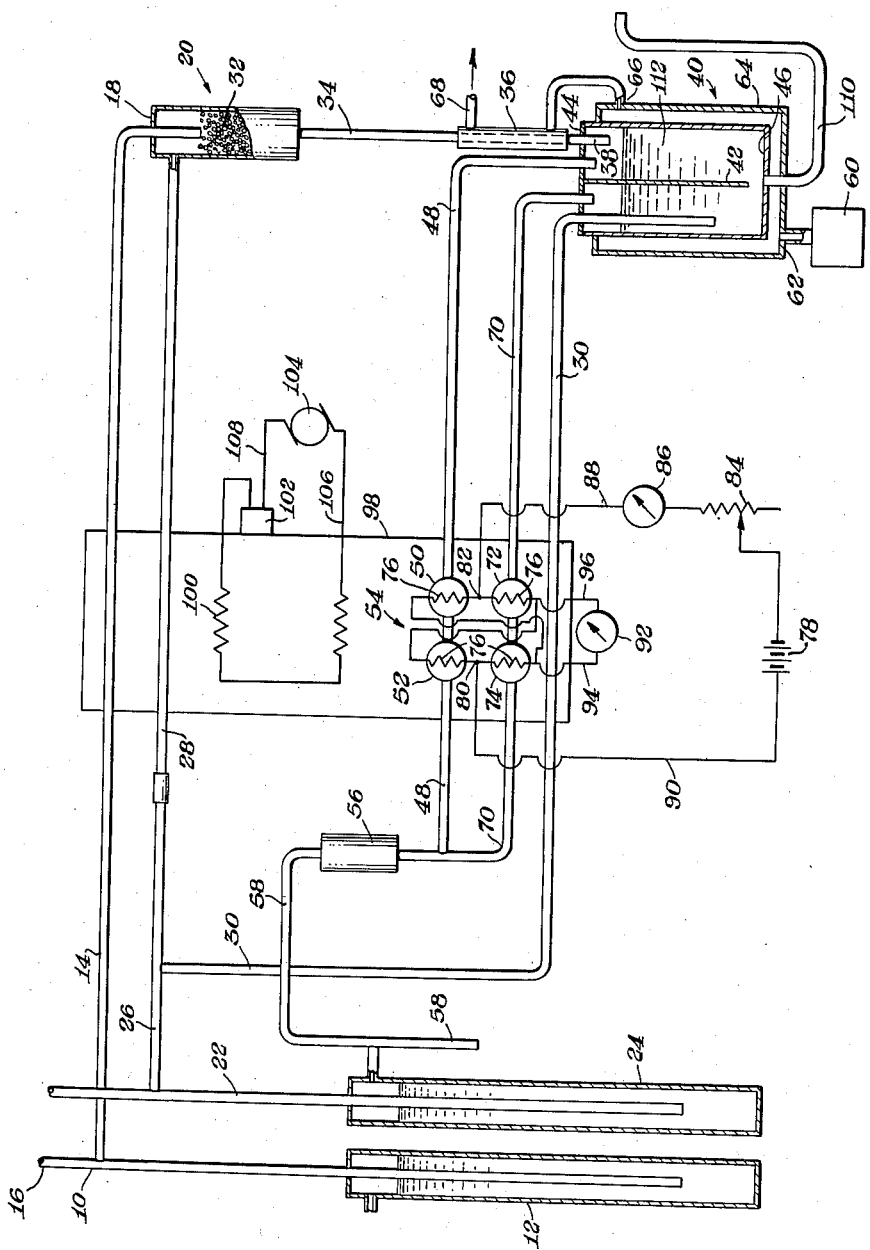
INVENTORS.
Leonard J. Kressley
BY Ludo K. Frevel
Griswold & Burdick
ATTORNEYS United States Patent Office 2,829,953
Patented Apr. 8, 1958

2,829,953

MEANS FOR DETERMINING THE EXTENT OF INERT IMPURITIES IN OXYGEN

Leonard J. Kressley, Saginaw, and Ludo K. Frevel, Midland, Mich., assignors to The Dow Chemical Company, Midland, Mich., a corporation of Delaware Application November 4, 1955, Serial No. 544,907

3 Claims. (Cl. 23—254)

This invention relates to an instrument for providing a continuous indication of the amount of inert impurities present in a stream of gas containing oxygen and chemically inert gases.

The purity of oxygen produced by air separation processes must often be such that the oxygen contains less than ½ of 1 percent of inert impurities such as nitrogen and argon, for example. Conventionally, samples from the oxygen stream are frequently analyzed during the oxygen production process, usually an air separation process, as a check on the purity of the oxygen stream.

Analysis of a gas stream on a sampling basis is, however, expensive, time consuming, and subject to variations due to differences in analytical technique of personnel doing the work.

Accordingly, a principal object of this invention is to provide an improved means for continuously indicating the amount of inert impurities present in an oxygen stream.

In accordance with this invention there is provided an oxygen purity analyzer through which gas from the stream to be analyzed is mixed with hydrogen in fixed proportions and passed at a constant flow rate through a combustion chamber where the oxygen is reacted with the hydrogen to form water. The gases remaining after the hydrogen-oxygen reaction are the impurities in the oxygen stream, and these impurities are passed through a thermal conductivity bridge. The degree of unbalance of the bridge is a measure of the impurities present in the oxygen stream.

The invention, as well as additional objects and advantages thereof, will best be understood when the following detailed description is read in connection with the accompanying drawing, which shows, in diagrammatical form, oxygen purity analyzer apparatus in accordance with this invention.

Referring to the drawing, the analyzer apparatus includes an oxygen inlet tube 10 which is coupled to a pressure regulator 12 which is a tube containing zinc chloride solution, for example, into which the oxygen inlet tube 10 extends. A capillary tube 14 is coupled to the oxygen inlet tube between the inlet end 16 of the tube 10 and the pressure regulator 12. The capillary tube 14 extends between the oxygen inlet tube 10 and the top 18 of an enclosed combustion chamber indicated generally by the numeral 20, the end of the capillary tube 14 extending into the chamber 20 about ⅓ of the length of the chamber.

A hydrogen inlet tube 22 extends into a pressure regulator 24 of the zinc chloride solution variety described above. A hydrogen distribution tube 26 is coupled to the hydrogen inlet tube 22. The hydrogen distribution tube 26 feeds a large bore capillary tube 28 which is coupled into the combustion chamber 20. The hydrogen distribution tube 26 also feeds a small bore capillary tube 30 which supplies a source of reference gas to the analyzer as will be described in detail later.

The combustion chamber 20 contains a palladium catalyst bed 32 which is used to cause burning of the hydrogen-oxygen gas mixture which passes through the chamber 20. The combustion chamber 20 is provided at its lower end with an outlet tube 34 which is surrounded along part of its length by a jacket 36 through which a coolant may be circulated.

The lower end 38 of the outlet tube 34 extends into and is sealed to the cover of a jacketed vessel, indicated generally by the numeral 40, which has a partition 42 extending from the covered top 44 thereof to near the bottom 46 of the vessel. An "impurities line" tube 48 extends through the covered top 44 of the vessel 40 and is disposed on the same side of the partition as the outlet tube of the combustion chamber. The "impurities line" tube 48 is coupled through two cells 50, 52 of a thermal conductivity cell bridge, indicated generally by the numeral 54, and thence through a flow meter 56 to a vent tube 58.

A source of coolant 60, such as water, is connected to the lower end 62 of the jacket 64 of the jacketed vessel 40. The coolant passes from the outlet 66 in the upper part of the jacket 64 to the lower part of the jacket 36 on the outlet tube 34 of the combustion chamber 20. A coolant outlet tube 68 is coupled to the upper part of the jacket 36 of the outlet tube 34.

The small bore capillary tube 30, mentioned previously, extends from the hydrogen distribution tube 26 through the covered top 44 of the jacketed vessel 40 and below the normal fluid level of the vessel 40. The small bore capillary tube 30 passes through the cover of the vessel 40 on the side of the partition 42 which is opposite the outlet tube 34 and the impurities line tube 48. A reference hydrogen tube 70 extends through the cover of the jacketed vessel 40 and is on the same side of the partition 42 as the small bore capillary tube 30. The reference hydrogen tube 70 is coupled through the remaining two cells 72, 74 of the thermal conductivity bridge 54 and then to the flow meter 56 and vent tube 58.

The thermal conductivity bridge 54 includes four cells (50, 52, 72, 74) each of which contains a resistance element 76. The resistance elements 76, which are usually but not necessarily of the same resistance value, are connected together to form two circuits in parallel.

The bridge 54 is energized in a conventional manner by a direct current source 78 which is coupled to the bridge at points 80, 82 through a rheostat 84, ammeter 86 and the leads 88, 90.

A potential indicator 92, such as a milli-volt meter, for example, is coupled across the bridge 54 through the leads 94, 96 to provide an indication of potential difference across the branches of the bridge.

The capillary tube 30 of the reference hydrogen line, the oxygen and hydrogen capillary tubes 14, 28 and the thermal conductivity bridge 54 are encased in a block 98 whose temperature is controlled by heater coils 100 and a thermostat 102 coupled within the block 98. The heater coils 100 are energized by a potential source 104, through the leads 106, 108.

The operation of the analyzer of this invention is as follows. Oxygen is fed through the oxygen inlet capillary tube 14 at a constant pressure which is sufficient to pass oxygen at the rate of 50 cc. per minute through the restricted bore of the tube 14 and into the combustion chamber 20. Hydrogen is fed at a rate of 110 cc. per minute through the capillary tube 28 which is coupled to the combustion chamber 20. The pressure regulators 12, 24 provide a means (by varying the length of tube which lies in the solution) for making small changes in the pressure of the gas streams. Hydrogen is also introduced, at a rate of 7 cc. per minute, to one side of the jacketed vessel 40.

The hydrogen-oxygen mixture in the combustion chamber 20 burns in the presence of the palladium catalyst bed 32, and the water vapor formed as a product of combustion is condensed as it passes downward through the cooled and jacketed (by 36) outlet tube 34. (An electric spark, however, could be substituted for the palladium catalyst bed.) The water vapor, condensed into droplets, falls into the interior of the jacketed vessel 40 which has been filled with water to the desired height as determined by the position of the level controlling tube 110 which communicates with the interior of the bottom part of the jacketed vessel 62. A coolant, such as water, for example, is fed into the lower end 62 of the cooling jacket 64 of the vessel 40 and passes from the upper end 64 of the jacket to the lower end of the jacket 64 surrounding the combustion chamber outlet tube 34.

The outlet tube 34 of the combustion chamber 20 permits the water vapor (combustion product), excess hydrogen and inert impurities to pass into the jacketed vessel 40. The water vapor condenses into droplets and fills the vessel as described before, the water 112 in the vessel rising well above the bottom of the partition 42. The excess hydrogen and the inert impurities then pass from the vessel 42 into the thermal conductivity cells 50, 52 through the "impurities line" tube.

The reference hydrogen which is to be fed to one side (cells 72, 74) of the thermal conductivity bridge passes through the small bore capillary tube 30 into the liquid 112 in the left compartment (as illustrated) of the jacketed vessel 40, bubbles upwardly through the liquid 112 and passes to the cells 72, 74 of the thermal conductivity bridge 54 through the reference hydrogen tube 70.

The thermostatically controlled block 98 is utilized to assure that the temperature of the cells (50, 52, 72, 74) of the bridge 54 and the gas entering the cells (through tubes 14, 28, 30, 70, and 48) is maintained at a substantially constant temperature.

As the excess hydrogen and impurities pass through the thermal conductivity cells of the bridge 54, the degree of imbalance of the bridge due to a change in resistance values attributed to a change in temperature of one or more of the resistance elements, is used as an indication of the extent of impurities present in the oxygen inlet tube. The degree of imbalance is shown by the indicator 92. Obviously a recording type indicator may be substituted for the milli-voltmeter indicator 92.

The hydrogen and oxygen volumetric ratio must be maintained within close limits. The volume of hydrogen entering the combustion chamber must be at least twice the volume of the oxygen entering the chamber in order that all the oxygen combines with hydrogen to form water vapor. An excess of hydrogen (10 cc./minute, for example) over the amount of hydrogen which will react with oxygen should be provided as a carrier for the inert impurities. The reference hydrogen rate of flow is about 7 cc./minute. However, sealed cells containing hydrogen could be used on the "reference" side of the bridge except for the loss of gas through the wall of the cell due to diffusion.

The analyzer may conveniently be calibrated by passing an oxygen stream having varying but known amounts of inert impurities through the bridge and noting the deflection on the scale of the millivoltmeter or other indicator.

We claim:
1. Apparatus for indicating the extent of inert impurities in a gas stream containing oxygen and inert impurities, comprising a combustion chamber, means for applying said gas stream to said combustion chamber at a substantially constant rate of flow, means for supplying hydrogen to said combustion chamber at a fixed volumetric ratio in excess of two to one with respect to the gas stream applied thereto, ignition means within said combustion chamber, an enclosed jacketed vessel having a top, bottom, sides and a partition extending between the sides and from the top to near the bottom of the vessel, said partition making gas tight contact between the sides and top of the vessel, a jacketed tube communicating with the interior of said combustion chamber and extending through the top of said jacketed vessel on one side of said partition, means for circulating coolant through the jacket of said jacketed vessel and then through the jacket of said jacketed tube, a thermal conductivity bridge comprising four thermal conductivity cells connected in a suitable circuit, potential means for energizing said bridge, said potential means being suitably coupled to said bridge, a bridge balance indicator, said indicator being suitably coupled across said bridge, impurities-carrying tubular means coupled through two of said thermal conductivity cells and extending through the top of said jacketed vessel on the same side of said partition as does said jacketed tube, means for supplying a reference stream of hydrogen gas at a substantially constant flow rate to said jacketed vessel, said means including a reference hydrogen gas inlet tube which extends through the cover of said jacketed vessel and below the operating fluid level of the vessel and is disposed on the side of said partition which is opposite the jacketed tube, a reference hydrogen gas outlet tube extending through the cover of said jacketed vessel and terminating above the operating level of liquid in said jacketed vessel, said reference hydrogen outlet tube being disposed on the same side of said partition as said reference hydrogen gas inlet tube and being coupled through the remaining two cells of said thermal conductivity bridge whereby the difference in thermal conductivity of the impurities passing through one pair of cells and the reference hydrogen gas passing through the other pair of cells is displayed on said indicator.

2. Apparatus in accordance with claim 1, wherein said thermal conductivity bridge is encased in a block-like member having a temperature controlling device incorporated therein.

3. Apparatus in accordance with claim 1, wherein said ignition means is a bed of particulated palladium.

References Cited in the file of this patent
UNITED STATES PATENTS

| | | |
|---|---|---|
| 2,349,250 | Doan | May 23, 1944 |
| 2,399,965 | Weber | May 7, 1946 |
| 2,743,167 | Cherry | Apr. 24, 1956 |
| 2,749,221 | Gilmont et al. | June 5, 1956 |